Nov. 21, 1961     S. L. C. NEWTON     3,009,721
PACKING RINGS AND GLANDS INCLUDING THE RINGS
Filed June 10, 1957     2 Sheets-Sheet 1
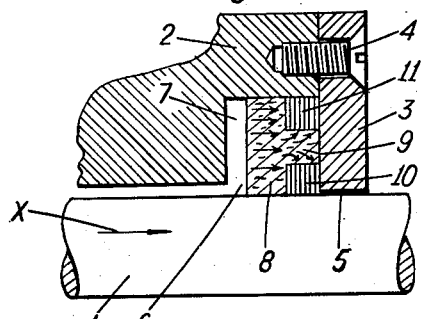
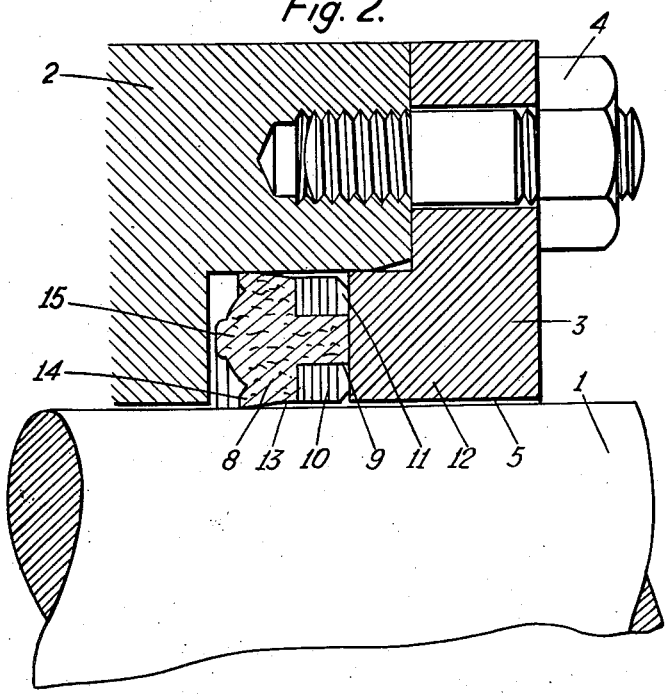
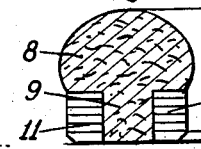
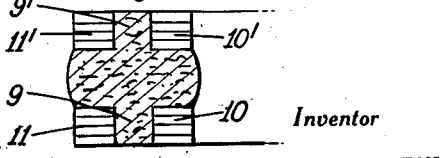
Inventor
SIDNEY LEONARD CHARLES NEWTON
By Lawson and Taylor
Attorneys

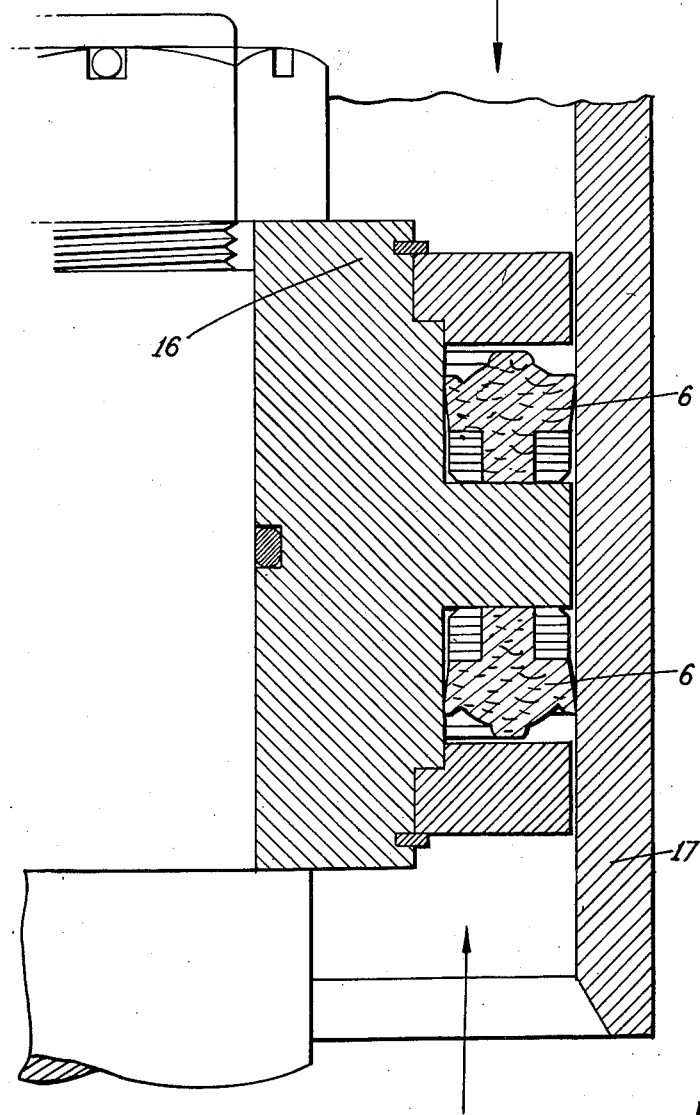

United States Patent Office 3,009,721
Patented Nov. 21, 1961

3,009,721
PACKING RINGS AND GLANDS INCLUDING
THE RINGS
Sidney Leonard Charles Newton, Slough, England, assignor to Ronald Trist & Co. Limited, Slough, England
Filed June 10, 1957, Ser. No. 664,798
5 Claims. (Cl. 288—4)

This invention relates to packing rings and to glands including such rings.

A gland comprises a housing which closely surrounds a reciprocating shaft or other moving member and a packing housed in an annular recess in the housing. It is common to use as the packing a readily deformable material such as rubber, the inner edge of which makes a seal against the shaft or the like on the application of pressure to its face. It is also well known to provide a backing of firmer material, which may be, for instance, leather, a plastic or laminated fabric bonded by rubber.

There is a slight annular clearance between the housing and the moving member, and the primary purpose of providing the backing is to prevent extrusion of the readily deformable material into this clearance space. It is, of course, the readily deformable material on which reliance is mainly placed to prevent the passage of fluid, and under fluid pressure applied axially to the face remote from the backing the sealing edge of the rubber moves radially into tight contact with the adjacent moving member, but the sealing edge of the backing does not move radially to the same extent. Accordingly, some of the readily deformable material is sometimes extruded axially between the backing and the surface of the shaft or the like and is soon severed from the remainder, so that the packing wears away.

It is an object of this invention to provide an improved gland in which the tendency of the packing to wear away is much reduced.

It is another object to provide an improved unitary packing ring.

In this invention extrusion of the readily deformable material at both annular edges is prevented or materially reduced by the provision of two annular backings, one surrounding the other and being radially separated from it by an axially projecting tongue of the readily deformable material, so that in use the backing of smaller diameter makes contact with the shaft or the like and the end plate of the housing, and the other backing makes contact with both the cylindrical part and the end plate of the housing. From another point of view the readily deformable material overlaps each backing both axially and radially.

In the accompanying drawings:

FIGURE 1 shows part of one gland according to the invention diagrammatically;

FIGURE 2 shows the preferred packing in another gland;

FIGURES 3, 4 and 5 are cross-sections through other forms of packing; and

FIGURE 6 shows part of a piston-and-cylinder assembly.

Referring first to FIGURE 1, a gland around a reciprocating shaft 1 comprises a composite housing, consisting of a cylindrical part 2 and an annular end plate 3 secured by screws 4 to the cylindrical part 2. The annular clearance between the housing and the shaft is shown at 5. With a packing consisting wholly of rubber it is into this clearance 5 and also between the radial mating faces of the part 2 and plate 3 that the rubber tends to be extruded. With a packing having a single backing, it is between the annular edges of the backing and respectively the shaft and the part 2 that there is a risk of extrusion.

In the invention, a packing 6 lying in an annular recess 7 in the housing comprises a rubber ring 8 with an annular tongue 9, and two backing rings 10 and 11 bonded to the ring 8, the ring 10 being inside and the ring 11 outside the tongue 9. Each backing ring consists of laminated fabric bonded by rubber. When fluid pressure is applied in the direction shown by an arrow X, it is transmitted both axially and radially through the tongue 9 to both backings, so as to force the backing 10 into contact with the shaft 1 and the backing 11 into contact with the cylindrical part 2.

In the gland in FIGURE 2 the end plate 3 has a spigot 12 fitting inside the cylindrical part 2, but otherwise the gland is the same as that in FIGURE 1. In the packing, however, the rubber ring 8 has inclined sides 13 and lips 14 which are pressed firmly into contact with the housing and the shaft when the packing is inserted in its recess. The packing also has an annular projection 15 to limit the axial movement of the packing in the recess.

FIGURES 3 and 4 show two different shapes of packing according to the invention, each consisting of a rubber ring 8 with a tongue 9 and backings 10 and 11 bonded to the ring 8.

FIGURE 6 shows two packings 6 of the shape shown in FIGURE 2 housed in recesses in a piston 16 with their outer edges sealing against a cylinder 17. Two packings are used in this piston in order to form seals against the fluid pressure applied in either axial direction.

Sealing in both axial directions may also be effected by a single packing such as that shown in FIGURE 5. Here a rubber ring 8 has a second tongue 9' projecting axially in the opposite direction to the tongue 9 and separating two further backing rings 10' and 11'. All five rings are bonded together.

In the packing rings shown all three components are rings, and the three rings are bonded together to form a unitary packing. However, if desired, the readily deformable material and the backings may be separate from one another, and any or all of them may be formed from segments which when assembled extend wholly around the recess or may be constituted by a strip of appropriate length to extend wholly around the recess.

As will be clear from FIGURE 6, the unitary packing rings of the invention are useful also in piston-and-cylinder assemblies.

I claim:

1. A packing comprising a sealing ring of readily deformable material having an annular rabbet at each of the inside and outside annular edges of one end face thereof to form an annular tongue on said end face extending axially of the ring from the main body thereof, and a pair of backing rings of firmer material relative to the sealing ring material each mounted in one of the rabbets in engagement with the tongue and having an axial thickness in the free state substantially equal to the axial extent of the rabbet in which it is mounted, the total radial thickness of the backing rings and the tongue in the free state being smaller than the radial thickness of the main body of the sealing ring.

2. A packing according to claim 1 wherein each of the backing rings engages the radial wall of the rabbet in which it is mounted.

3. A packing according to claim 1 wherein the sealing ring has an annular recess in the other end face thereof to form axially extending annular lips at each annular edge of said other end face.

4. A packing according to claim 1 wherein the other end face of the sealing ring has a curvilinear radial section.

5. A packing according to claim 1 wherein the sealing ring also has an annular rabbet at each of the inside and outside annular edges of the other end face thereof to form an annular tongue on said other end face extending axially of the sealing ring from the main body thereof, and further comprising a second pair of backing rings of firmer material relative to the sealing ring material each mounted in one of the rabbets in said other end face in engagement with the tongue thereon and having an axial thickness in the free state substantially equal to the axial extent of the rabbet in which it is mounted, the total radial thickness of the second pair of backing rings and the tongue on said other end face in the free state being smaller than the radial thickness of said main body of the sealing ring.

References Cited in the file of this patent

UNITED STATES PATENTS

| | | |
|---|---|---|
| 1,294,829 | Prescott | Feb. 18, 1919 |
| 2,081,040 | King | May 18, 1937 |
| 2,184,087 | Schwarz | Dec. 19, 1939 |
| 2,394,715 | Phillips | Feb. 12, 1946 |
| 2,417,828 | Joy | Mar. 25, 1947 |
| 2,585,556 | Johnson | Feb. 12, 1952 |
| 2,823,058 | Ecker et al. | Feb. 11, 1958 |

FOREIGN PATENTS

| | | |
|---|---|---|
| 559,350 | Great Britain | Feb. 15, 1944 |